Figure 1:
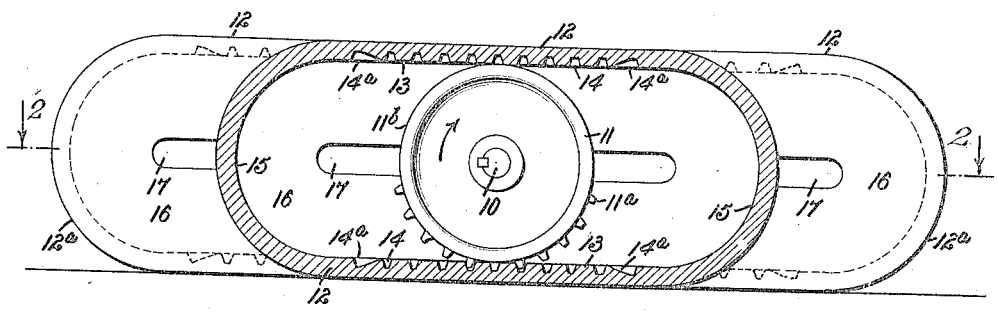

J. BEARD.
TRACTOR.
APPLICATION FILED JUNE 3, 1916.

1,206,500.

Patented Nov. 28, 1916.

WITNESSES
Frederick Diehl.

INVENTOR
James Beard
BY
ATTORNEYS

UNITED STATES PATENT OFFICE.

JAMES BEARD, OF DOS RIOS, CALIFORNIA.

TRACTOR.

1,206,500.

Specification of Letters Patent. Patented Nov. 28, 1916.

Application filed June 3, 1916. Serial No. 101,477.

*To all whom it may concern:*

Be it known that I, JAMES BEARD, a citizen of the United States, and a resident of Dos Rios, in the county of Mendocino and State of California, have invented a new and Improved Tractor, of which the following is a full, clear, and exact description.

My invention relates to the type of tractor wheel of which examples are shown in United States Patents No. 1,106,182 granted to me August 4, 1914, and No. 1,155,872 granted to me October 5, 1915. The wheels illustrated in these patents include a plurality of oblong track sections disposed in angular relation to one another, and gear elements fixed on a shaft passing transversely through the said elements and meshing with teeth or internal racks on the track sections so that the latter are alternately turned about the respective gear elements to present the track sections successively in horizontal positions for the forward traveling thereon of the gear elements.

The present improvement has in view the possibility of one of the track sections being positioned on a stone or other elevation in the road when the said section is in upended position, thus giving the remaining track sections a tendency to drop and thus engage the gear teeth at the opposite side of a gear wheel, the result of which would be to reverse the movement of the track section and disturb the normal relation of the respective sections.

To provide against the contingency referred to I form the track sections with toothed surfaces or racks between the ends thereof leaving plain, untoothed interior semi-circular surfaces at the ends between said tracks. Similarly, the respective gear elements are mutilated, being provided with toothed surfaces and plain surfaces at opposite sides and extending respectively on the wheel to an extent to effect engagement of the teeth with the racks on the track sections and to present the plain surfaces of the wheels to the untoothed semi-circular surfaces at the ends of the track sections.

Reference is to be had to the accompanying drawings forming a part of this specification in which similar reference characters indicate corresponding parts in all the views.

Figure 2:
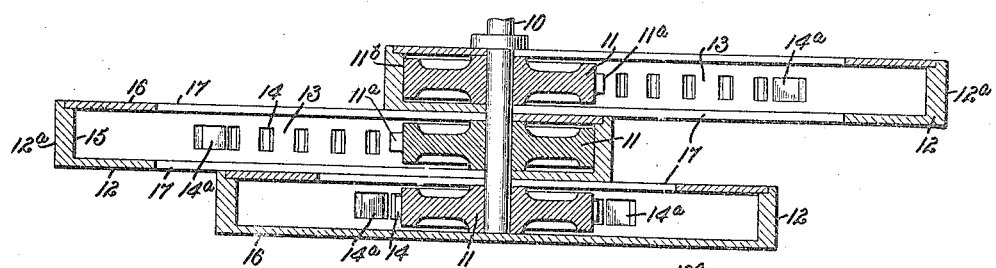
Figure 3:
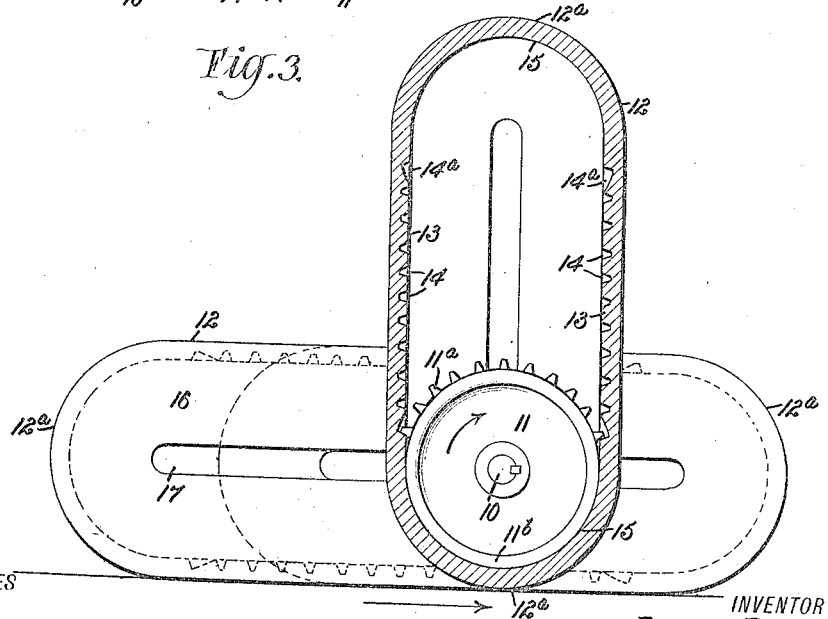

Figure 1 is a sectional side elevation of a tractor wheel embodying my present invention; Fig. 2 is a horizontal section on the line 2—2, Fig. 1; Fig. 3 is a sectional side elevation showing the track sections in a different relation from that illustrated in Fig. 1.

In carrying out my present invention, an axle 10 is provided, and fixed thereon is a series of gear wheels 11. Associated with each gear wheel 11 is an oblong track section 12 provided on the interior thereof with teeth 13 with which the gear wheels 11 mesh. The respective track sections are rigid and non-deformable and are moved relatively to one another in response to the turning of the wheels 11 with the axle 10. The several sections are disposed with their major axes in such angular relation that a longer side of one track section will always be on the ground. Also, it is to be observed that the exterior end surface $12^a$ of the track sections are rounded that they may readily roll thereon in turning. In the illustrated example, three track sections are shown, that number being effective in insuring an ample total surface in contact with the ground. A wheel 11 will travel along its track section when the major axis of the latter is disposed horizontally until the forward end of said section is reached by the wheel 11, whereupon the said section will be turned on the forward rounded end thereof. Thus, the respective sections will be brought successively into the horizontal position, the several sections being alternately and intermittently turned.

In accordance with my present invention the rear track section is formed with series of teeth 13, parallel with the major axis of the section on the opposite walls thereof. The said teeth are preferably formed by producing depressions 14 in the inner longitudinal surfaces of the track sections. The opposite end surface 15 of each track section, at the interior, is made plain or untoothed. Similarly, each wheel 11 is formed with teeth $11^a$ on a portion of its peripheral surface and with a plain untoothed surface $11^b$ for the remainder of the periphery. The teeth $11^a$ extend a total distance to correspond with the length of series of depressions 14 in the track section 12 and the plain surface $11^b$ of the wheel 11 corresponds approximately with the plain semi-circular end surface 15 of said track section. It is to be noted that the end depressions, designated at $14^a$, flare at one side at a greater angle than the remainder of the depressions 14, the purpose of which is to give clearance to the end teeth 11ª in leaving the racks to contact with the plain surfaces 15.

By the described arrangement, the respective track sections will be turned by the gear wheels 11 and should a track section, while up-ended, ride upon a stone or other elevation in the road, the dropping of another section will not effect engagement of the upper side thereof with the teeth of the corresponding gear wheel 11.

The numeral 16 indicates side plates to house the gears, and 17 indicates slots in certain of said plates to permit the movements of the track sections.

Having thus described my invention, I claim as new, and desire to secure by Letters Patent:

1. In a tractor wheel, a series of separate, self-laying, oblong track sections, the sections being rigid and non-deformable and disposed side by side with their major axes in angular relation, said sections having internal teeth at opposite sides parallel with the major axes of the sections, the ends of the sections at the interior presenting untoothed semi-circular surfaces, an axle extending transversely through the track sections, and a series of wheels on said axle, one wheel for each track section, the gear wheels presenting teeth to engage the teeth of the track sections and said wheels for a portion of the periphery being untoothed to correspond with the untoothed end surfaces of the track sections.

2. In a tractor wheel, a series of separate, self-laying, oblong track sections, the sections being rigid and non-deformable and disposed side by side with their major axes in angular relation, said sections having internal teeth at opposite sides parallel with the major axes of the sections, the ends of the sections at the interior presenting untoothed semi-circular surfaces, an axle extending transversely through the track sections, and a series of wheels on said axle, one wheel for each track section, the gear wheels presenting teeth to engage the teeth of the track sections and said wheels for a portion of the periphery being untoothed to correspond with the untoothed end surfaces of the track sections; the teeth of the track sections alternating with depressions in the said sections and the end depressions having a greater flare than the remaining depressions to afford clearance for the end teeth on the wheels in leaving the teeth of the track sections.

JAMES BEARD.